Oct. 1, 1957
T. DOUMA
2,808,566
DIRECTIONAL APPARATUS FOR USE WITH HIGH
FREQUENCY TRANSMISSION LINES
Filed Jan. 12, 1953
FIG_1_
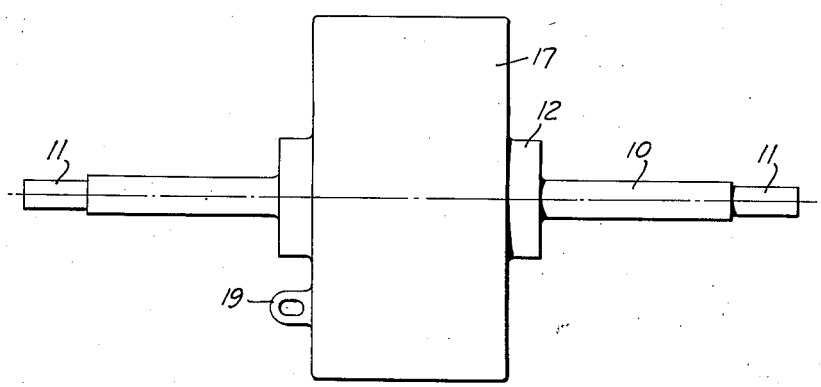
FIG_2_
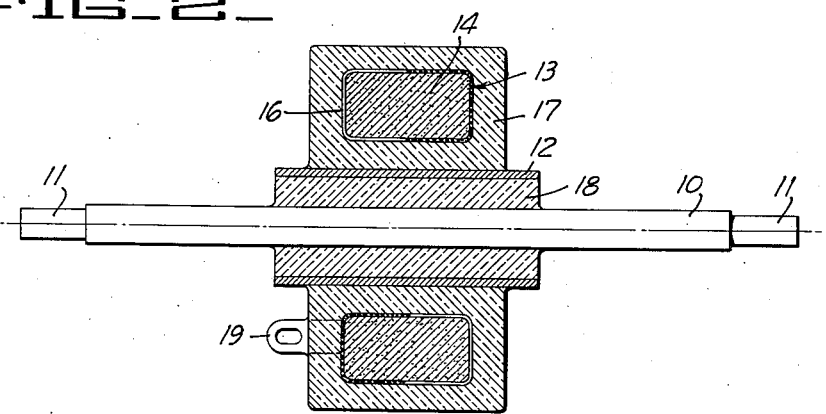
FIG_3_
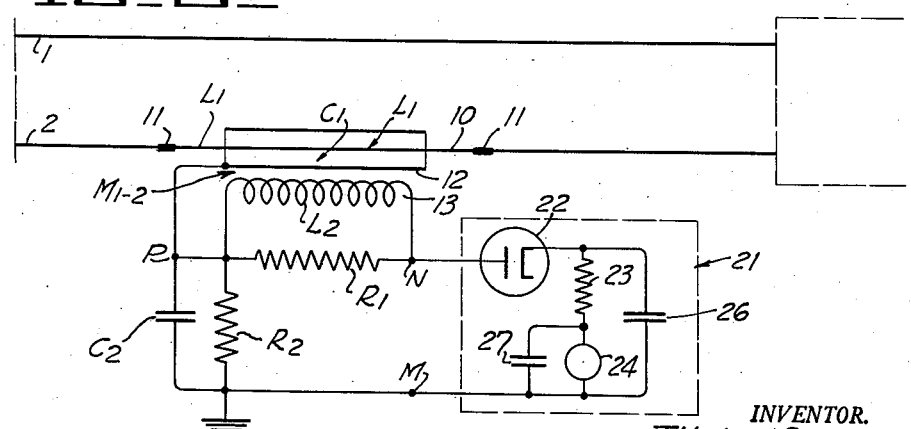
INVENTOR.
Tjiske Douma
BY
ATTORNEYS

United States Patent Office 2,808,566
Patented Oct. 1, 1957

2,808,566

DIRECTIONAL APPARATUS FOR USE WITH HIGH FREQUENCY TRANSMISSION LINES

Tjiske Douma, Haddonfield, N. J., assignor to Sierra Electronic Corporation, San Carlos, Calif., a corporation of California Application January 12, 1953, Serial No. 330,808

8 Claims. (Cl. 324—127)

This invention relates generally to apparatus for coupling to high frequency transmission lines, and particularly to apparatus having directional characteristics.

In conjunction with the adjustment, testing or operation of high frequency equipment it is frequently desirable to provide apparatus serving to indicate proper matching of a high frequency transmission line with a filter network, load or other system to which the line is supplying high frequency energy. A mis-matched condition causes energy to be reflected back through the transmission line from the load, with resulting loss of efficiency. The amount of reflected energy for a given amount of energy supplied to the line from the source increases with increase in mis-match condition, and is substantially zero for perfect match.

In general it is an object of the present invention to provide directional apparatus of the above character which can be employed to measure or indicate the amount of high frequency energy flowing in either forward or reverse direction through a transmission line.

A further object of the invention is to provide relatively simple apparatus of the above character which can be used to obtain a null reading for proper match between a high frequency line and an associated load or equivalent system.

Another object of the invention is to provide a simple directional coupler which can be readily applied to transmission lines, and which can be used in conjunction with a simple indicating system.

Additional objects and features of the invention will appear from the following description in which the preferred embodiment of the invention has been set forth in detail in conjunction with the accompanying drawing.

Referring to the drawing:

Figure 1 is a side elevational view illustrating a coupling device made in accordance with the present invention.

Figure 2 is a side elevational view in section, showing the same device as in Figure 1.

Figure 3 is a circuit diagram serving to schematically illustrate the manner in which the device of Figures 1 and 2 is used in conjunction with a transmission line of the parallel conductor type.

The directional coupling device illustrated in Figures 1 and 2 consists of a central conductor 10, which has its end portions 11 formed to facilitate its insertion in one conductor of a parallel conductor transmission line. A cylindrical conductor 12, and an inductance 13, are disposed concentrically about the conductor 10. The inductance 13 consists of a core 14 of suitable magnetic material such as "Ferrite," and in the form of a toroid. The core is wrapped with the winding 16. The inductance 13 is imbedded in a body 17 formed of suitable moldable plastic, and this body is bonded to the sleeve 12. The sleeve is also bonded to the conductor 10 by the plastic 18. Suitable terminal tabs 19 can be carried by the body for making electrical connection with external parts of a circuit.

Figure 3 schematically illustrates the electrical relationship between the parts described above and a high frequency transmission line. The transmission line in this instance is of the parallel conductor type, consisting of the conductors 1 and 2, which for example extend from a source of high frequency energy to a load to which energy is being supplied. With proper impedance matching, substantially all of the energy is absorbed by the load. However, with a condition of mis-match, more or less energy is reflected from the load toward the source. The cylindrical conductor 12 provides a fixed capacitance $C_1$ and this capacitance is connected to ground through the series capacitance $C_2$. One terminal of the inductance 13 is connected to conductor 12, and the inductance is shunted by the resistor $R_1$. It is desirable to provide a second resistor $R_2$ in shunt with the capacitance $C_2$. The elements $C_2$, $R_1$ and $R_2$ are not illustrated in Figure 2, but can be conveniently imbedded in the plastic body 17.

Suitable voltage indicating means 21 is connected to indicate resultant voltage. This indicating means can consist of a rectifying diode 22 of the crystal type, having its anode connected to one terminal of the inductance 13. Its cathode is connected to ground through the resistor 23, and the indicating meter 24, which can be of the microammeter type. The resistor 23 and the meter 24 are shown shunted by condenser 26, and the meter 24 is shunted by the by-pass condenser 27. With the arrangement illustrated in Figure 3, a voltage indication is obtained when voltages are developed between the points M and N.

The series capacitances $C_1$ and $C_2$ form a high impedance which in effect is shunted across the transmission line, and which functions as a voltage divider to derive a voltage appearing between the points P and M, that is proportional to the high frequency line voltage. The inductance 13 forms a current transformer, and serves as a relatively low impedance in series with the line to derive a voltage proportional to the transmission line current. The latter voltage is developed between the points P and N. The resultant of the two derived voltages serves to develop voltage between points M and N, to operate the indicating means.

With proper selection of values the arrangement as described above is substantially completely directional. For high frequency energy flowing through the line in a forward direction, the phase relationship between high frequency voltages developed between points P and N, and P and M, are substantially 180° out of phase, and therefore no voltage is developed between points M and N. However, for the reflected energy flowing in a reverse direction, the phase relationship between the derived voltages is such that resultant voltage is developed between points M and N, to operate the indicating meter 24. Likewise by proper selection of the various elements, the apparatus can be used to operate over a relatively broad band, with the same sensitivity at every frequency. For example, I have constructed apparatus suitable for use with parallel conductor transmission lines for a frequency band ranging from 30 to 600 kilocycles.

With respect to the selection of values for the various elements, it is desirable that the impedance of $R_1$ be small compared to the impedance of the inductance 13. For example, in one instance the inductance 13 was 25 millihenries, and in the form of a toroid, as illustrated, and $R_1$ was 1000 ohms. Another reason why $R_1$ is small is because in general it increases the frequency where the parasitic shunt capacitance of the inductance 13 tends to play a role. It may be explained that at the higher frequencies the parasitic parallel capacitance of the toroid inductance can cause a disturbing phase angle shift, thus effectively limiting the practical range of operation. The smaller the value of resistor $R_1$, the lower such disturbing phase shift will be, thus effectively increasing the operating frequency band.

Even when resistor $R_1$ is relatively small compared to the reactance of inductance 13, it still causes some amount of undesirable phase shift. However, such a disturbing phase shift can be compensated for by the resistor $R_2$ which is shunted across the capacitance $C_2$. In the particular example previously mentioned, $R_2$ had a value of 16,700 ohms, in contrast with 1000 ohms for the resistor $R_1$. In the same example, the condenser $C_1$ had a capacitance of 10 mmf., and capacitance $C_2$ had a value of 1,490 mmf.

It will be evident from the above that resistor $R_1$ is important for broad band operation. Resistor $R_2$ is of far less importance, although it is desirable for a very broad frequency range. Without $R_2$ it is not possible to obtain an absolute zero reading for the lower end of a very broad frequency range. Omission of resistor $R_1$ provides apparatus which in practice can be adjusted for only one frequency.

It will be evident that various types of indicating means can be used to indicate the voltages developed across points M and N. The diode rectifier and the meter 24 provide a simple means for this purpose. The additional elements associated with the meter 24, including the resistor 23, and condenser 26, provide means for integrating the rectified pulses. In some instances it may be desirable to make resistor 23 adjustable. This permits adjusting it to lower values when the reading of meter 24 approaches zero, with resulting greater sensitivity due to the more accurate tuning. The impedance shunted across M and N, by the metering circuit becomes unimportant when the voltage $V_{MN}$ approaches zero.

As one example of commercial applications where my invention can be used to advantage, a source of high frequency energy, such as a power amplifier, can be coupled to a parallel conductor transmission line, and this line in turn connected to a filter network. One may wish to provide means enabling adjustment of the network for proper match. The network may, for example, require an impedance of 3000 ohms for proper match. As a second application, a parallel conductor transmission line may supply energy to a radio antenna. One may wish to provide means to indicate when the antenna is tuned for proper match. The antenna when properly tuned may have an apparent impedance of 600 ohms. In each application it may be necessary to operate at various frequencies over a band of from say 30 to 600 kc. For the first application mentioned above, namely for the transmission line which supplies the filter network, suitable values for the different elements of that apparatus shown in Figure 3 can be as follows:

*Example 1*

| | | |
|---|---|---|
| $C_1$ | mmf | 10 |
| $C_2$ | mmf | 1490 |
| $L_2$ | millihenries | 25 |
| $R_1$ | ohms | 1000 |
| $R_2$ | do | 16,700 |

For the second application, namely for the transmission line which supplies energy to the antenna, the values can be as follows:

*Example 2*

| | | |
|---|---|---|
| $C_1$ | mmf | 10 |
| $C_2$ | mmf | 1490 |
| $L_2$ | millihenries | 25 |
| $R_1$ | ohms | 200 |
| $R_2$ | do | 83,300 |

Assuming proper selection of values as indicated above, the network is adjusted for null reading of the indicator, and when so adjusted it will have the desired resistance of 3000 ohms, looking from the transmission line into the filter. In the second application a null reading is provided when the antenna coupling circuit is tuned to provide a resistive load of 600 ohms.

In both of the above-mentioned examples Nos. 1 and 2, the current transformer was the same, with the current ratio being 100 to 1, that is:

$$\frac{M_{1-2}}{L_2} = \frac{1}{100}$$

($L_2$ being the value of inductance 13 in henries). The value of capacitance $C_1$ was also made the same for both examples, namely 10 mmfs. The composing voltages $V_{MP}$ and $V_{NP}$ were taken 10 volts rms for frequencies where $R_1 \ll \omega L_2$. At ninety degrees out of phase this gives 20 volts peak at MN, or in other words, 40 volts peak inverse on the diode.

The above are examples serving to illustrate the manner in which my apparatus can be used. In addition to such applications, the apparatus can be used for resistance measurements, as for example, by making the capacitance $C_2$ adjustable, and noting the value where the meter 24 reads minimum for an unknown load resistance. This capacity can be readily calibrated in terms of load resistance.

The mathematical equations applicable to the arrangement of Figure 3 are as follows: The equation for determining the voltage developed between points M and N is:

Equation 1

$$V_{MN} = \frac{1}{1 + \frac{C_2}{C_1} + \frac{1}{j\omega C_1 R_2}} E - \frac{j\omega M_{1-2} R_1}{j\omega L_2 + R_1} I$$

where:

$V_{MN}$ is the voltage between points M and N,
$\omega$ is the angular frequency,
E is the voltage between conductor 2 and ground,
I is the current in conductor 2,
$L_1$ is the inductance created by conductor 2,
$L_2$ is the inductance 13, and
$M_{1-2}$ is the mutual inductance between $L_2$ and $L_1$.

For matched condition $$\frac{E}{I} = Z_0$$

Making substitutions for E and I in Equation 1 gives the following:

Equation 2

$$\frac{V_{MN}}{E} = \frac{1}{1 + \frac{C_2}{C_1} + \frac{1}{j\omega C_1 R_2}} - \left(\frac{j\omega M_{1-2} R_1}{j\omega L_2 + R_1}\right)\left(\frac{1}{Z_0}\right)$$

when $V_{MN} = 0$, Equation 2 can be rewritten as follows:

Equation 3

$$1 + \frac{C_2}{C_1} + \frac{1}{j\omega C_1 R_2} = \left(\frac{L_2}{M_{1-2}} \times \frac{1}{R_1} + \frac{L_2}{M_{1-2}} \times \frac{1}{j\omega L_2}\right) Z_0$$

Splitting Equation 3 for real and imaginary parts, provides the following:

Equation 4a $$\frac{Z_0}{1 + \frac{C_2}{C_1}} = \frac{M_{1-2}}{L_2} R_1$$

Equation 4b $$C_1 R_2 = \frac{M_{1-2}}{L_2} \frac{L_2}{Z_0} = \frac{M_{1-2}}{Z_0}$$

For a sufficiently high frequency the phase angle caused by the inductance 13 and represented by $R_1/\omega L_2$ radians is relatively small. For such an operating frequency the voltages between points NP and PN are practically independent of frequency, and the resistor $R_2$ can be omitted. However, as previously pointed out, it is desirable to retain this resistor in order to make possible a complete null over the entire desired frequency range. In Figure 3 it also serves as a direct current path for the diode.

In the foregoing I have referred to transmission lines of the parallel conductor type. The apparatus is also applicable to transmission lines of the coaxial conductor type. This requires connecting conductor 11 in series with the center conductor of a coaxial line. Metal shielding is disposed in spaced relation about the body 17 and is connected to the adjacent ends of the outer grounded conductor of the coaxial line.

I claim:

1. In high frequency directional apparatus for use with transmission lines of the type serving to supply high frequency energy to an energy absorbing system or load, means forming a high impedance in shunt with the line for deriving a high frequency voltage proportional to the line voltage, said means comprising capacitances in series and arranged to form a voltage divider, means forming a relatively low impedance in series with the line for deriving a high frequency voltage proportional to the line current, said last means including a lumped inductance, said derived high frequency voltages being out of phase for energy transfer through the line in one direction, said lumped inductance being connected directly to a selected point on said voltage divider whereby the said two high frequency voltages are combined to form a resultant high frequency voltage, and indicating means connected to receive said resultant high frequency voltage and give an indication of its magnitude.

2. In high frequency directional apparatus for use with transmission lines of the type which serve to supply high frequency energy to energy absorbing system or load, means forming a relatively high impedance in shunt with the line for deriving a high frequency voltage proportional to the line voltage, said means comprising capacitances in series and arranged to form a voltage divider, means forming a relatively low impedance in series with the line for deriving a high frequency voltage proportional to the line current, said last means including a current transformer, the derived high frequency voltages being out of phase for energy flow through the line in a direction toward the load, said current transformer being connected directly to a selected point on said voltage divider whereby the said two high frequency voltages are combined to form a resultant high frequency voltage, and indicating means connected to receive said resultant high frequency voltage and give an indication of its magnitude.

3. In high frequency directional apparatus for use over a substantial frequency range with transmission lines of the type which serve to supply high frequency energy to an energy absorbing load, means forming a relatively high impedance in shunt with the line for deriving a high frequency voltage proportional to the high frequency line voltage, said means comprising first and second capacitances in series and arranged to form a voltage divider, a winding associated with one conductor of the transmission line and functioning as a current transformer, indicator means adapted to secure an indication in response to voltages applied to its input terminals, one terminal of said winding being connected directly to said indicator means, the other terminal of said winding being connected directly to the common terminal of said first and second capacitances, the first of said capacitances being connected to the conductor of the transmission line with which said winding is inductively associated, and a resistor having a value which is small compared to the effective impedance of the winding and connected in shunt directly across said winding.

4. Apparatus as in claim 3 in which the first capacitance is formed by a conductor element which is disposed in capacitative relationship with said one conductor.

5. Apparatus as in claim 3 together with a second resistor which is shunted directly across said second capacitance, said second resistor having a value which is relatively high compared to the impedance of said second capacitance.

6. In directional apparatus of the character described for application to parallel conductor high frequency transmission lines of the type serving to supply high frequency energy to an energy absorbing system or load, a conductor section adapted to be connected in series with one conductor of the transmission line, a metal sleeve surrounding said conductor section and insulated therefrom, an annular magnetic core surrounding the sleeve, a winding upon the said core, said core and winding forming in effect a current transformer with respect to the transmission line, said sleeve having a fixed capacitance with respect to the conductor section, an indicating circuit responsive to high frequency voltage applied to its two input terminals, a second capacitance connecting said sleeve to ground and providing a capacitance in series with the capacitance between the sleeve and said conductor, said capacitances forming a high impedance across the line and giving rise to a high frequency voltage which is proportional to the high frequency line voltage, one end of said winding connected directly to the junction between the said capacitances and the other end of said winding being connected to one terminal of the indicating circuit, the second terminal of said indicating circuit connected to ground.

7. Apparatus as in claim 6 together with a resistor shunted directly across said winding and a second resistor having a value which is relatively high compared to the impedance shunted directly across said second capacitance.

8. In high frequency apparatus for use with transmission lines of the type serving to supply high frequency energy to an energy absorbing system or load, means forming a high impedance in shunt with the line for deriving a high frequency voltage proportional to the high frequency line voltage and independent of frequency, said means comprising capacitances in series and arranged to form a voltage divider, means forming a relatively low impedance in series with the line for deriving a high frequency voltage proportional to the line current, said last means including lumped inductance, said derived high frequency voltages being out of phase for energy transfer through the line in one direction, said voltage divider and said lumped inductance being directly connected whereby the high frequency voltages are combined to form a resultant high frequency voltage, and indicating means connected to receive said resultant high frequency voltage and give an indication of its magnitude.

References Cited in the file of this patent

UNITED STATES PATENTS

| | | |
|---|---|---|
| 2,423,416 | Sontheimer et al. | July 1, 1947 |
| 2,467,648 | Alexander | Apr. 19, 1949 |